United States Patent [19]

Hay, II

[11] 4,368,093

[45] Jan. 11, 1983

[54] HEATING ELEMENTS FOR THERMOPLASTIC LAMINATION

[75] Inventor: Robert A. Hay, II, Midland, Mich.

[73] Assignee: The Dow Chemical Company, Midland, Mich.

[21] Appl. No.: 236,958

[22] Filed: Feb. 23, 1981

[51] Int. Cl.³ ............................................... B65C 1/00
[52] U.S. Cl. .................................... 156/443; 156/185; 219/552; 338/254; 338/283; 338/293
[58] Field of Search ............... 156/367, 443, 185, 186; 219/464, 528, 543, 552, 538; 338/212, 254, 255, 280–281, 283–284, 287–288, 289, 293, 295

[56] References Cited

U.S. PATENT DOCUMENTS 1,050,912   1/1913   Bolling ................................ 338/288
1,282,476  10/1918   Simon .............................. 338/254 X
2,518,941   8/1950   Satchwell et al. .............. 338/254 X
4,175,998  11/1979   Hay et al. ........................ 219/552 X

FOREIGN PATENT DOCUMENTS 1043221  11/1953   France ............................ 338/288 X Primary Examiner—David A. Simmons
Attorney, Agent, or Firm—R. B. Ingraham

[57] ABSTRACT

Laminated heating elements are provided which are suitable for joining synthetic resinous thermoplastic bodies particularly thermoplastic foams. The heating elements are of laminar structure having at least two oppositely disposed heating elements which electrically may be fed in parallel. A significant improvement in rigidity and resistance to mechanical abuse is achieved.

16 Claims, 9 Drawing Figures

HEATING ELEMENTS FOR THERMOPLASTIC LAMINATION

In many instances it is desirable to join thermoplastic materials together by means of heat welding or fusion. Oftentimes synthetic resinous bodies are not readily prepared by conventional extrusion or molding processes which are of sufficient size for a desired application. A typical example of such situations is in the insulation of vessels. For example, vessels are oftentimes beneficially thermally insulated by means of the spiral deposition of a preformed foamed thermoplastic strip about their periphery to provide a layer of foamed insulation of desired thickness. Frequently, the deposited foam strip includes glass fiber reinforcing therein and a vapor barrier such as aluminum strip on the outer surface thereof. Insulation of the vessels employing the spiral generation technique is disclosed in U.S. Pat. Nos. 4,017,346 and 4,050,607, the teachings of which are herewith incorporated by reference thereto. In the insulation of vessels or other structures using the spiral generation technique, a foam strip is positioned by means of a foam-depositing head. The foam-depositing head is supported external to the structure and adjacent the tank. The foam depositing head is moved in a generally helical spiral path as a foam strip is fed to the head, the head heating the foam strip to cause softening thereof and each loop of the strip about the tank is welded to its adjacent neighbor. In cases where such spirally generated insulation is employed on vessels used for cryogenic applications, for example, on a vessel for the containment of liquefied natural gas, the insulation is subjected to substantial thermal stresses. The thermoplastic foam used for such insulation will be subjected to ambient temperatures on the outside of the insulation while on the inside temperatures can be about $-260°$ F. Such a thermal gradient can result in fracture or at least partial fracture of a weld between adjacent turns of thermoplastic foam. In the past, such welds have not always shown the desired degree of uniformity, such uniformity being evaluated by sampling a portion of the insulation in which at least one weld exists, breaking the foam adjacent the weld and examining the weld for uniformity of nonfoamed polymer generated during the welding process. In the spiral generation of an insulating layer about a cylindrical tank, less difficulty is encountered because of a tendency of the heat-welding blade to move from between adjacent strip portions; however, on the insulation of spherical tanks where the radius of curvature changes and one encounters variations from the design geometry of the structure, the heating element or blade may move from its desirable position between adjacent foam strips, and weld less than the desired area.

A particularly desirable foam bonding apparatus is described in U.S. Pat. No. 4,175,998. The heating element employed comprises a plurality of L-shaped elements generally nested in edge to edge relationship to form a heating platen which successfully bonds synthetic resinous foam in a spiral generation application. Such a heating element suffers from the disadvantage that it is relatively susceptible to damage when being mishandled, that is the L-shaped elements may be disturbed relatively readily from their original planar location if reasonable care is not exercised during handling. The weld or joint produced between the foam bodies does not have when sectioned an aesthetically appealing uniformity. The bond or weld between adjacent foam bodies exhibits nonuniformity generally corresponding to the slots adjacent the L-shaped elements which lie parallel to the direction of movement of the heat sealing or welding platen. Mechanically, such nonuniformities are of no significance. The heat sealing element of U.S. Pat. No. 4,175,998 provides strong sound bonds between adjacent foam thermally insulating elements. However, the apparent nonuniformity of the joint is abhorrent to those who are familiar only with metal welding techniques where visual uniformity is at a premium.

It would be desirable if there were available an improved heating element for the preparation of joints between thermoplastic bodies which provided a joint which had a visually uniform cross section.

It would also be desirable if there were available an improved heat joining element for synthetic resinous thermoplastic bodies having improved resistance to mechanical damage.

It would also be desirable if there were available an improved heat sealing or welding element for joining foam plastic bodies in the spiral generation processes.

These benefits and other advantages in accordance with the present invention are achieve in an apparatus for the thermal bonding of synthetic resinous bodies wherein the apparatus provides a heated platen to be disposed between adjacent bodies to be joined, means for moving said platen relative to the bodies to be joined, means to heat the platen to a temperature sufficient to heat plastify adjacent surfaces of the bodies to be joined, and means to contact said heated surfaces which on cooling provide a bond between adjacent foam bodies, the improvement which comprises an improved heating platen, the heating platen being of laminar construction and generally planar configuration, the heating platen comprising a first electrically conductive lamina and a second electrically conductive lamina, the first and second lamina being affixed to each other in generally face to face relationship; the first and second lamina having a first electrical terminal and a second common electrical terminal, the first and second lamina each defining a plurality of slots wherein the first and second lamina are joined to provide mutual mechanical reinforcing to minimize bending of the platen under service conditions.

Further features and advantages of the present invention will become more apparent from the following specification taken in connection with the drawing wherein:

FIG. 9 is a sectional view taken along the line 9—9 of FIG. 7.

Figure 1:
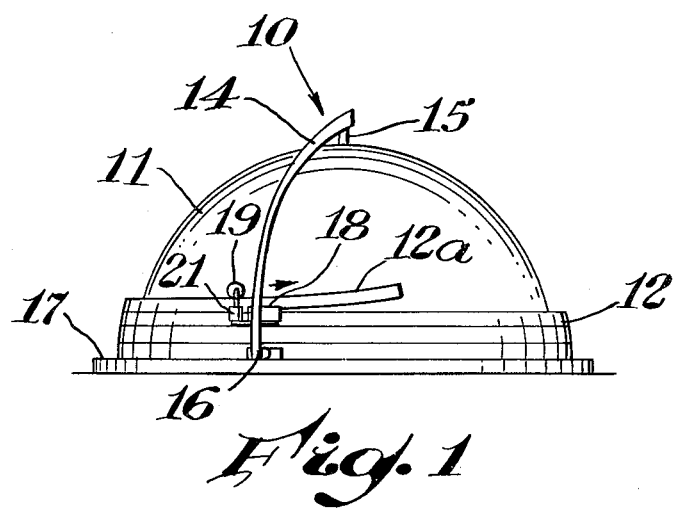
FIG. 1 is a simplified schematic representation of apparatus for the spiral generation of an insulating layer of thermoplastic foam about a vessel.

In FIG. 1, there is shown a simplified schematic representation of an apparatus in accordance with the invention designated by the reference numeral 10. The apparatus 10 is operating on a structure 11 depositing insulation 12 in form of a plurality of loops. The apparatus 10 comprises a first support means 14 such as a curved track. The first support means 14 is pivotally affixed to the spherical container 11 by means of a pivot 15. The first support means 14 has a second or lower end 16 which is supported by a track or rail 17 permitting the support means 14 to move around the insulation 12 and container 11. An insulation-depositing means or foam-depositing head 18 is supported on the first support means 14. The foam-depositing head 18 has rolls 19 and 21 in engagement with foam insulation 12 and a foam billet 12a being deposited by the foam depositing head 18. Rolls 19 and 21 move the head 18 and the first support means 14 in a generally spiral-helical path about the container 11 until a substantial portion of the surface is covered with insulating material 12. The head 11 has a heating platen or element (not shown) which, by melting adjacent surfaces of thermoplastic foam 12a and 12, the molten surfaces are forced together and, on cooling, a monolithic insulation is obtained.

Figures 2, 4:
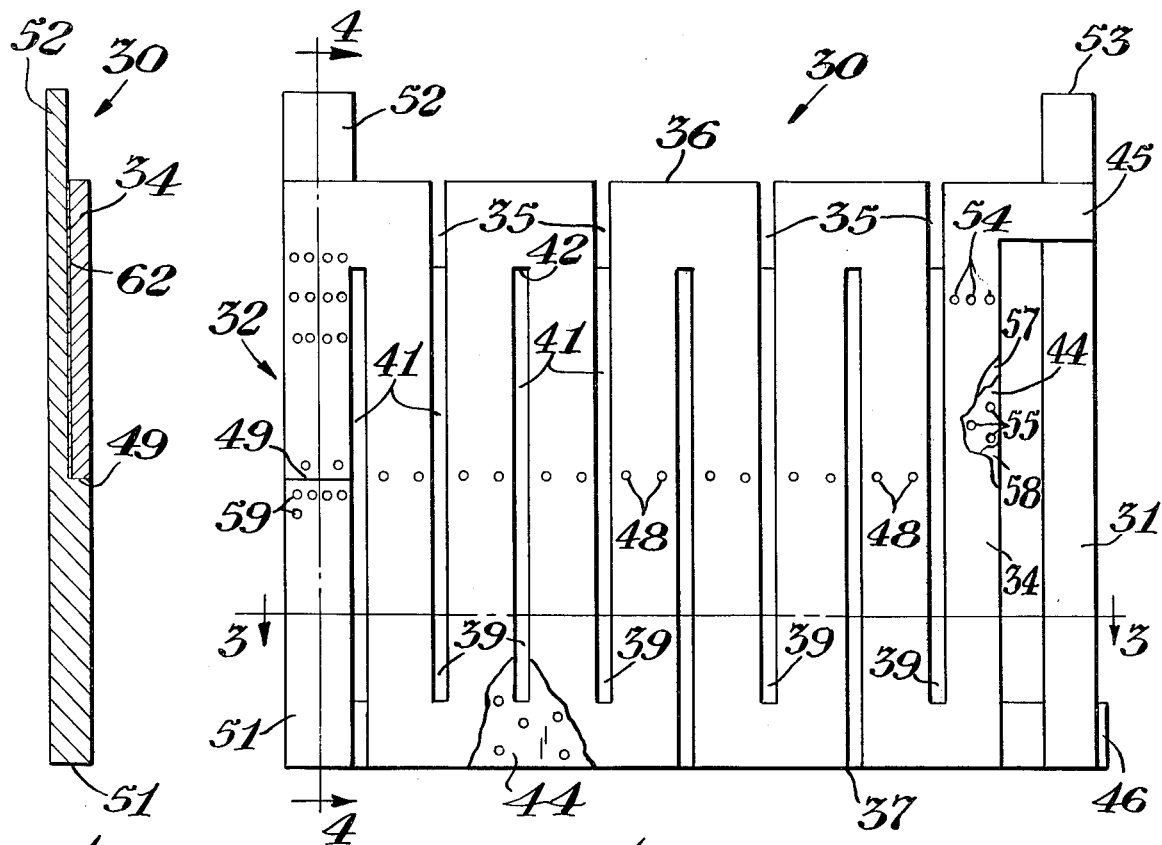
FIG. 2 is a schematic partially cutaway view of a heating platen in accordance with the present invention.
FIG. 4 is a sectional view of the platen of FIG. 2 taken along the line 4—4 thereof.

In FIG. 2, there is depicted a schematic partially cutaway view of a heating platen in accordance with the present invention generally designated by the reference numeral 30. The platen 30 is suitable for use in the apparatus 10 of FIG. 1. The platen 30 has a leading edge 31 and a trailing edge 32. The platen 30 is of generally rectangular configuration and comprises a first generally serpentine heating element 34. The heating element 34 has a generally rectangular configuration, and defines a first series of slots 35 extending from a first edge 36 adjacent the leading edge 31 toward a second edge 37 adjacent the trailing edge 32 of the platen. The slots 35 terminate at locations 39 which are spaced from the edge 37. A first serpentine heating element 34 defines a second plurality of slots 41. The slots 41 extend from the second edge 37 toward the first edge 36 and terminate at a location 42 spaced from the first edge 36. The sots 35 and 41 are in interdigitated relationship. A second serpentine heating element 44 is disposed adjacent the heating element 34. Both the elements 34 and 44 are of generally planar configuration, of generally like dimension and generally like configuration. The heating element 44 is arranged with its slots which correspond to slots 35 and 41, generally in alignment or in register with 35 and 41 of the heating element 34. However, the slots in element 44 extend inwardly into element 44 from the opposite edge to the corresponding slot in element 34. The heating element 34 has a first electrical terminal 45 whereas the heating element 44 has a first electrical terminal 46. The terminal 45 is disposed generally adjacent the edge 31 of the platen 30, and the terminal 46 is disposed generally adjacent the leading edge 31 of the platen 30. The heating elements 34 and 44 are joined together by means of a plurality of spot welds 48. The spot welds 48 are disposed along a line generally midway between and parallel to the edges 36 and 37 of the heating element 34. Remote from the terminals 45 and 46 the serpentine heating elements 34 and 44 terminate at a common termination 49 generally remotely disposed from the terminals 45 and 46. Heating element 44 connects to the common terminal 49 by a single layer element 51 which is approximately twice the thickness of the material employed for the remaining portion of the element 44. The common terminal 49 is connected to a low resistive terminal which extends toward and beyond the edge 36 of the element 34. A low resistance bus 53 is electrically connected to terminals 45 and 46. The heating element 34 defines a plurality of openings 54, whereas the heating element 44 defines therein a plurality of openings 55. The heating element 34 as depicted in FIG. 2 has electrically insulating coating 57 disposed on the surface remote from the viewer as depicted in FIG. 2. The heating element 44 has an insulative coating 58 disposed on the surface of element 44 closest to the viewer as depicted in FIG. 2. In the region of the spot welds 48, the insulative coating has been removed. The single layer element 51 remotely disposed from terminals 45 and 46 defines a plurality of openings 59, and the openings 59 are of sufficient area that the electrical resistance of element 51 per unit length is equal to or approximates the resistance per unit length of the perforated portions of elements 34 and 44. The conductive bus 53 beneficially has a thickness less than the combined thickness of the elements 34 and 44.

Figure 3:
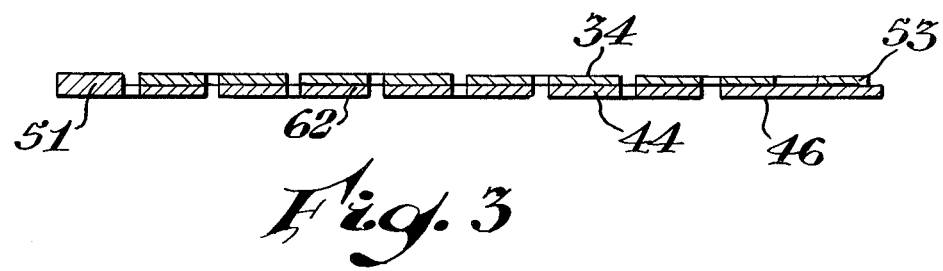
FIG. 3 is a sectional view of the platen of FIG. 2 taken along the line 3—3 thereof.

FIG. 3 is a sectional view of the heating platen 30 of FIG. 2 taken along the line 3—3 thereof showing a cross-section view of the serpentine heating elements 34 and 44 and the element 51. The heavy line indicated by the reference numeral 62 indicates the location of insulative layers 57 and 58.

In FIG. 4, there is depicted a sectional view of the heating platen 30 of FIG. 2 taken along the line 4—4 of FIG. 2 showing the common junction 49, the single layer element 51 of heating element 44 and the resistive bus 52 and insulative layers indicated by the reference numeral 62 electrically separating the heating element 34 from the resistive bus 52.

In operation of the platen 30 as depicted in FIGS. 2, 3 and 4, terminals 45 and 46 are fed in parallel by the bus 53 and the remaining power source in connected to the bus 52. Electric current flows within the serpentine heating elements in opposite directions until it reaches the common terminal 49. Electrically the heating elements 34 and 44 are connected at locations indicated by the spot welds 48 and the common terminal 49. These locations are locations of equipotential for practical purposes and no significant current flows between the elements 34 and 44. The single layer element 51 of the heating element 44 is perforated to provide a resistance generally equivalent to one-half of the resistance presented by any one leg of either of the serpentine heating elements. The resistive bus 52 is perforated to provide a resistance generally corresponding to that of the adjacent portion of the heating element 34. The resistive coating 57 and 58 prevent current flow between the elements 34 and 44 at regions remote from the spot weld 48 and the common terminal 49; and the coatings 62 prevent current flow between the adjacent heating element 34 and resistive bus 52 except for the common junction 49. Mechanically, the two heating elements 34 and 44 provide mutual support for each other at locations where the slots such as 35 and 41 reach edges such as the edges 36 and 37, thus providing a substantial mutual reinforcement to prevent bending of either element in the event of rough handling. Advantageously the low resistant bus 53 if made of copper can be readily repositioned in the plane of the heating platen 30, in the event of a mechanical misadventure which bends it from the plane. Advantageously, the platen 30 with the exception of the low conductive bus 53 is entirely of stainless steel. If desired and maximum rigidity is required, the low conductive bus 53 may also be prepared of stainless steel, beneficially unperforated and having a thickness less than the total thickness of the combined thickness of the heating elements 34 and 44.

Figure 5:
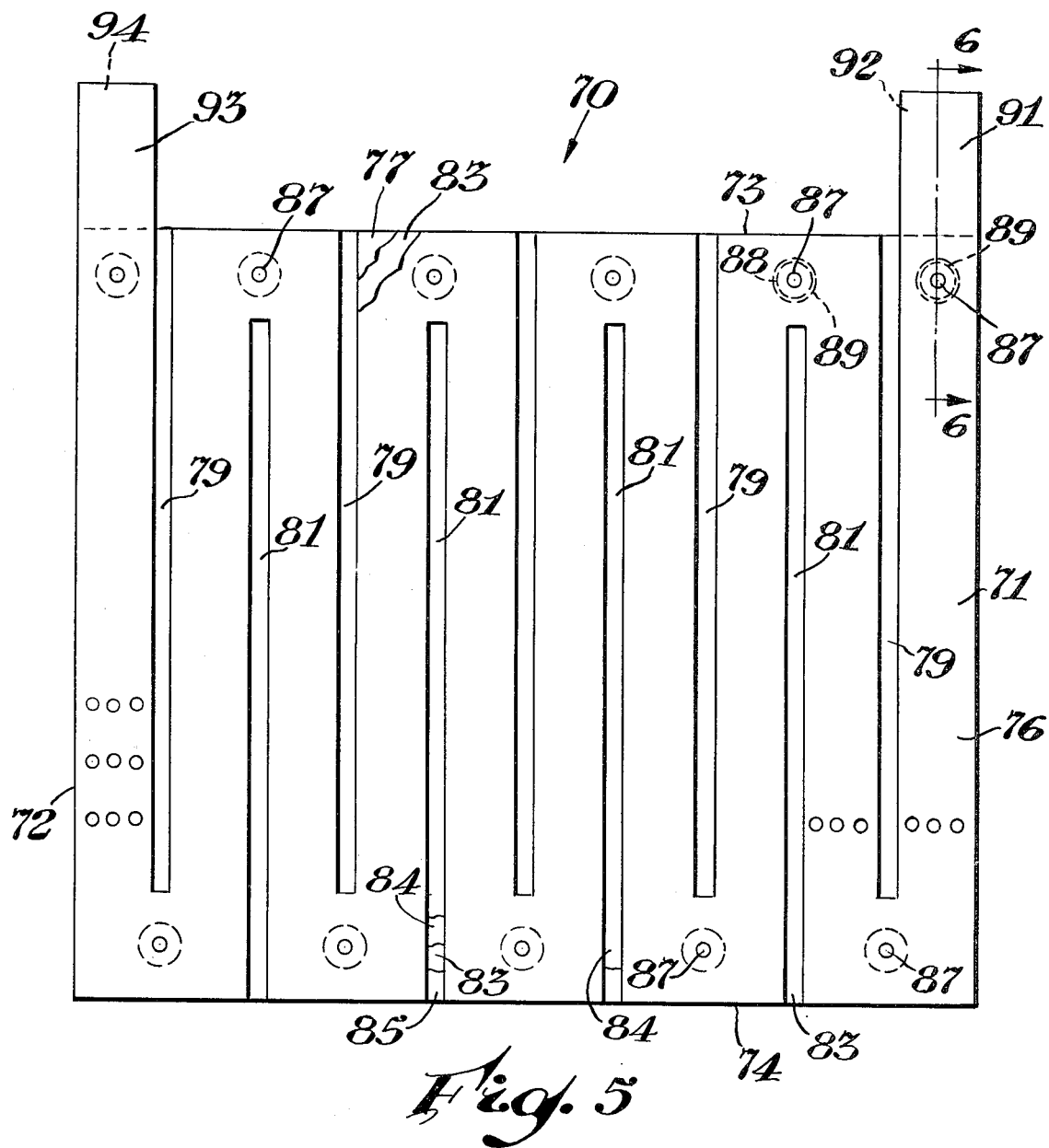
FIG. 5 is a plan view of an alternate embodiment of the invention.

In FIG. 5 there is depicted an alternate heating platen in accordance with the present invention generally designated by the reference numeral 70. The platen 70 has a first edge 71, a second edge 72 and in operation may be used with either edge 71 or edge 72 as the leading edge. The platen 70 has a first or electrical input side 73, and a second or non-input side 74. In operation in the spiral generation of a vessel, the side 74 is disposed generally adjacent the vessel. The heating platen 70 comprises a pair of like serpentine heating elements 76 and a second like heating element 77. The heating elements 76 and 77 each define a first series of slots 79. The slots 79 extend from the edge 73 toward a location spaced from the edge 74. The elements 76 and 77 define a second series of slots 81. The slots 81 extend from the edge 74 to a location spaced from the edge 73. The first and second series of slots 79 and 81 respectively are in interdigitated relationship. The first and second series of slots 71 and 89 extend angularly with respect to the direction of travel of the platen. A rigid spacer element 83 is disposed between the heating elements 76 and 77. The heating elements 76 and 77 are electrically insulated from the spacing element 83 by means of a first insulating coating 84 disposed on the face of the spacer 83 nearest the viewer as depicted in FIG. 5. A second insulating coating 85 is disposed on the face of the element 83 which is remote from the viewer as depicted in FIG. 5. The elements 76 and 77 are joined by a plurality of pins 87 which extend from heating element 76 through the spacer 83 into heating element 77, and advantageously are welded to the heating elements 76 and 77 to provide a rigid connection therebetween. Each of the pins 87 passes through an opening 88 defined by the spacer 83. Disposed within each of the openings 88 is a generally hollow cylindrical insulating member 89. Each of the serpentine heating elements 76 and 77 terminate in first electrical terminals 91 and 92 and second electrical terminals 93 and 94.

Figure 6:
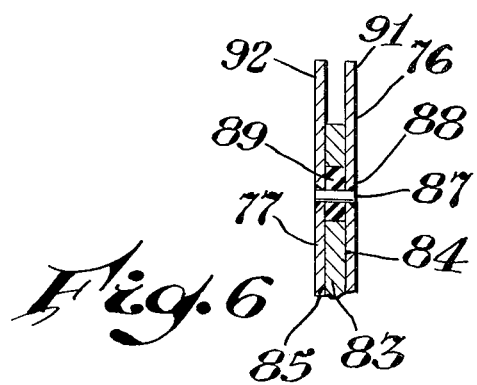
FIG. 6 is a sectional view of FIG. 5 taken along the line 6—6 thereof.

FIG. 6 is a sectional view through a portion of the heating platen of FIG. 5 taken along the line 6—6 thereof showing the relationship between terminals 91 and 92, the spacer 83, the insulative coatings 84 and 85, the hollow cylindrical insulator 89 and the openings 88 defined in the spacer 83. Welding of the pins 87 is also indicated in FIG. 6.

In operation of the heating platen 70 of FIGS. 5 and 6, electric power is fed to terminals 91 and 92 in parallel and connected to terminals 93 and 94 in parallel. Thus on the assumption that the heating elements 76 and 77 are of equal resistance, each will heat to a generally like temperature, while the spacer 83 disposed between the heating elements is electrically insulated from the current supplied to the terminals of the platen 70. The spacer 83 beneficially is of a rigid material such as stainless steel, and the connection of the heating elements 76 and 77 at a location generally adjacent the terminal portion of the slots 79 and 81 and provides a rigid structure which is not readily deformed by conventional mishandling. The slots 79 and 81 extend generally normal to the direction of travel of the platen and a smooth weld of generally uniform cross sectional configuration.

Figure 7:
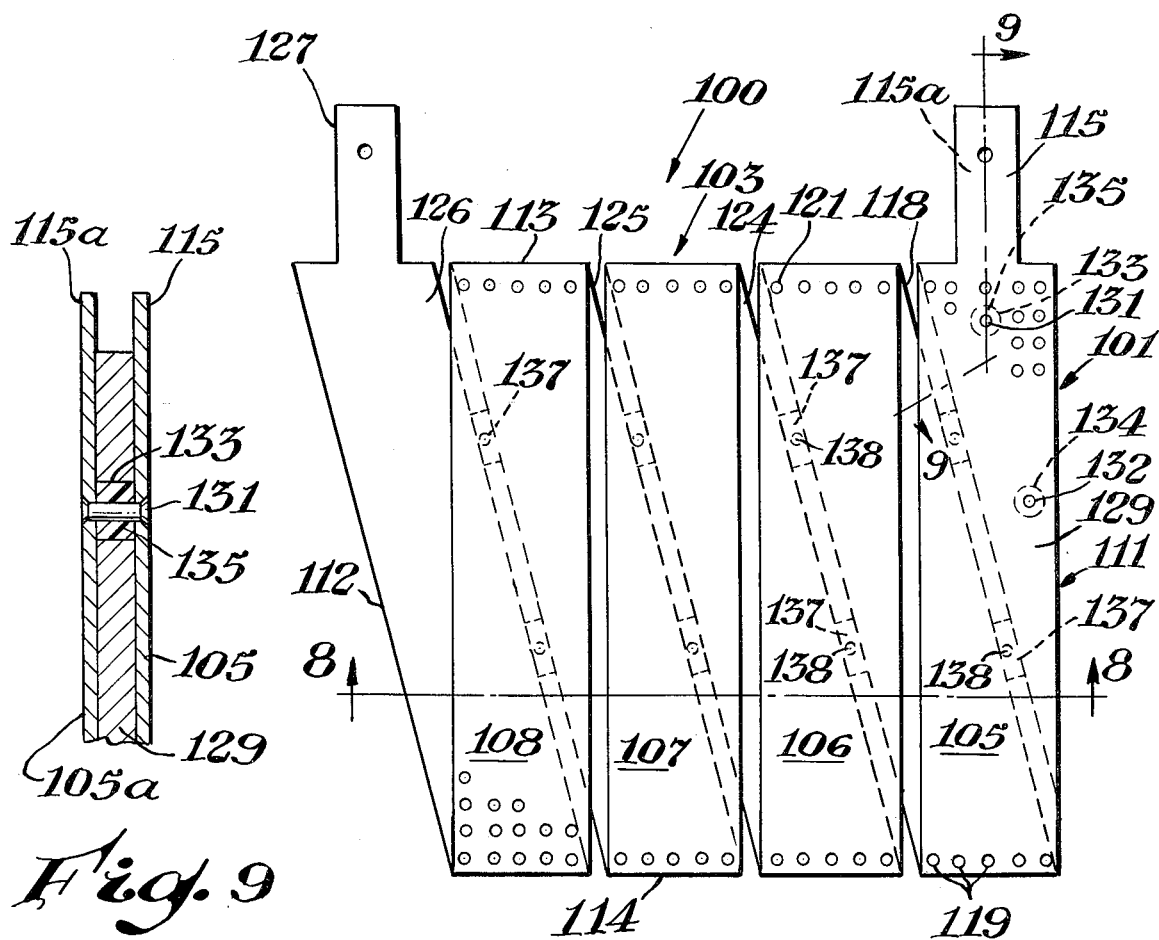
FIG. 7 is a plan view of an alternate platen in accordance with the present invention.

In FIG. 7, there is depicted a plan view of a heating platen in accordance with the present invention generally designated by the reference numeral 100.

Figure 8:
FIG. 8 is a sectional view taken along the line 8—8 of FIG. 7.
Figure 8:
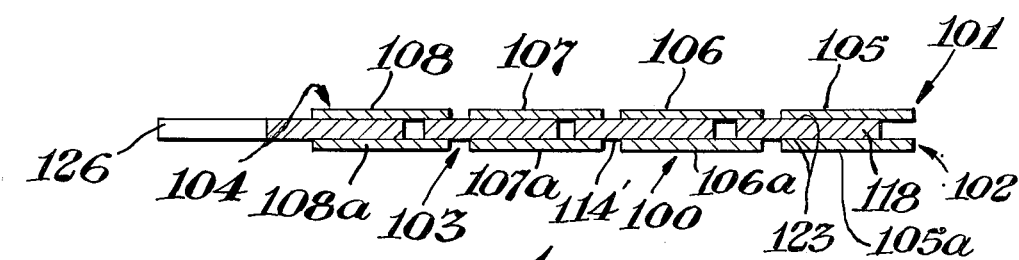

In FIG. 8, there is depicted a sectional view of the platen 100 taken along the line 8—8 of FIG. 7. With reference to FIGS. 7 and 8 the heating platen 100 functionally comprises a first serpentine heating element generally designated by the reference numeral 101 and a second serpentine heating element 102. The platen 100 comprises a first layer of resistive heating elements, the layer being designated by the reference numeral 103; and a second layer generally designated by the reference numeral 104. The layer 103 comprises a plurality of generally like rectangular elongate parallel heating elements 105, 106, 107 and 108; whereas the layer 104 comprises resistive heating elements 105a, 106a, 107a and 108a. The platen 101 has a first or leading edge 111 and a second or trailing edge 112, a third external or power feed edge 113 and a fourth or vessel side edge 114. The heating elements 105 through 108 and 106a through 108a extend generally from edge 113 to edge 114 and are generally coplanar and disposed in spaced apart relationship. The element 105 has affixed thereto an electrical contact terminal 115 which is generally coplanar with the element 105 and integral therewith. A similar electrical contact terminal is affixed to the element 105a and is disposed beneath the contact terminal 115. Diagonally disposed spacer element 118 is positioned between heating elements 105 and 105a and affixed thereto at a location remote from the terminal 115 adjacent edge 114. The spacer element 118 is also disposed between heating elements 106 and 106a and is generally coextensive therewith at a location at edge 113. The spacer element 118 is generally a trapezoidal configuration and provides a link between oppositely disposed ends of the elements 105 and 105a and elements 106 and 106a. A plurality of welds 119 serves to rigidly affix the spacer 118 to heating element 105 and 105a and a second series of welds 121 affixes an opposite end of the spacer 118 to the heating elements 106 and 106a. Advantageously, the spacer 118 is electrically insulated from the elements 105 and 105a and elements 106 and 106a by means of insulative coatings 123 depicted in FIG. 8. The insulative coatings 123 have been removed from the regions of the welds 119 and 121. In a similar manner, a spacer 124 diagonally connects opposite ends of heating elements 106 and 106a and 107 and 107a. A spacer 125 similarly connects the opposite ends of elements 107 and 107a and 108 and 108a. A spacer 126 is diagonally affixed to elements 108 and 108a adjacent edge 114. The spacer 126 has the general configuration of spacers 118, 124, and 125 and is disposed generally parallel thereto. Remote from its point of connection to elements 108 and 108a, spacer 126 terminates in an electrical terminal 127 adjacent edge 113 of the platen 100. A generally triangular spacer 129 having the configuration of a right triangle is disposed between elements 105 and 105a. The hypotenuse of the spacer 129 is generally parallel to the adjacent edge of spacer 118. The spacer 129 is electrically insulated from the elements 105 and 105a and is maintained in position by pins 131 and 132 which pass through openings 133 and 134 formed in the spacer 129. A hollow cylindrical insulating member 135 and like member 136 are disposed within the openings 133 and 134 to maintain electrical insulation and mechanical positioning of the spacer 129.

FIG. 9 is a sectional view along the line 9—9 of FIG. 7 depicting the electrical terminal portions 115 and 115a of elements 105 and 105a as well as the opening 133, having disposed therein an electrical insulator 135 and disposed within the spacer 129. Between adjacent spacers such as the spacer 129 and adjacent spacer 118, between spacers 118 and 124, between 124 and spacer 125, between 125 and 126 are disposed generally rectangular insulating blocks indicated by the reference numeral 137.

For clarity of illustration all such blocks have not been provided with reference numerals. The insulator blocks 137 are generally commensurate in thickness with the thickness of the spacers 129, 118, 124, 125 and 126. Spacer 129 is electrically insulated from elements 105 and 105a by means of insulating layers not shown. The blocks are maintained in position each by a pin designated by the reference numeral 138 which is affixed to the opposed heating elements, such as 105, 105a, 106, 106a and the like in a similar manner to that employed with pin 131.

In operation of a platen in accordance with FIGS. 7, 8 and 9, the edge 112 is employed as the leading edge of the platen when utilized in an apparatus such as the apparatus of FIG. 1. The edge 111 is the leading edge; the edge 112 is the trailing edge; the edge 114 is disposed adjacent the vessel being insulated while edge 113 is disposed remote from the vessel being insulated. Electric power is applied in parallel to terminals 115 and 115a and a common lead connected to terminal 127. The electric current flows generally equally divided between the heating elements such as elements 105, 105a, 106, 106a, etc., whereas the trapezoidal spacers such as spacers 118, 124, 125 and 126 carry the sum of the currents of the oppositely disposed heating elements 105, 105a, 106, 106a, etc. Advantageously, as depicted in FIG. 9, the platen 100 employs stainless steel construction with perforated sheet being used for the heating elements such as elements 105, 105a, 106 and 106a, and solid stainless steel sheet for the spacing elements 129, 118, 124, 125 and 126. A heating platen such as the platen 100 is relatively resistant to distortion through mishandling and accidental encounters with unforseen objects.

Heating elements for use in the practice of the present invention may be prepared from any desired metal that has adequate stiffness for the intended purpose. Such elements are readily fabricated from steel, aluminum, brass and the like. Advantageously for maximum service, minimum maintenance and a reasonable compromise on cost such elements advantageously are fabricated from the so-called stainless steels. Particularly desirable steels include American Institute of Steel and Iron, Types 316 and 317 although for many purposes, Type 304 stainless steel is very adequate. The choice of the particular metal or alloy is dependent on the type of service required by the element, the environment in which it will be used and the conventional availability of materials from which it may be fabricated. When such heating platens are employed for the insulation of vessels on shipboard in locations adjacent salt water, Type 316 or 317 stainless steel is desirable. So-called black iron or hot rolled sheet may readily be employed for use under less demanding circumstances. Although assembly of the platens in accordance with the invention has been described employing spot welds, such welds are primarily a matter of convenience; and other metal joining techniques may be employed such as conventional oxyacetylene or fusion welding, conventional arc welding, and very desirably tungsten inert gas welding with benefit where maximum physical strength and reliability of the welds is desired. Advantageously, the metals from which the heating elements are formed are usually in sheet form and for most applications, the individual sheets will vary in thickness from about 0.2 inches to about ⅛ inch. Advantageously, such sheet metals may be perforated to provide the desired electrical resistance and provide elements of sufficient thickness to provide the desired rigidity for a particular laminating operation; for example, the amount of perforation being dependent on the size of the platen rigidity desired and the power source available to provide the desired electric power to cause heating of the platen. As a matter of practical convenience, conventional arc welders provide a relatively inexpensive and readily available power source which usually has an open circuit voltage sufficiently low that electric shock to operating personnel is minimized. Advantageously, most of such welding supply or arc welders as they are popularly known provide a means of controlling voltage and current thus permitting control of the laminating platen temperatures within a desired operating range. In the use of platens in accordance with the present invention, generally as the lineal rate of lamination is increased, the temperature of the platen is increased in order to provide the desired degree of fusion.

Beneficially, the spacing members employed in the embodiment of the invention which employ more than two layers of conductive material desirably are also of metal, although in certain instances where electrical conductivity is not employed, ceramic spacers may be utilized. However, for most applications the toughness and impact resistance of a metal layer is usually found more desirable. Such metal layers desirably are of metal of similar composition to that employed in the heating elements in such as Types 316 or 317 stainless steel. The insulating layers or coatings employed with platens in accordance with the present invention may be adhered or nonadhered to adjacent surfaces. Such electrical insulating coatings or layers may be of a wide variety of materials including glass, ceramics, synthetic resins, minerals either processed or unprocessed for example mica. A variety of electrical insulating coatings are relatively readily available including glass, glass cloth, glass cloth impregnated with thermally insulating synthetic resins such as tetrafluoroethylene polymers, phenolic resins, especially resins and the like. Mica sheets may be employed or in the case of such insulating coatings may be bonded or unbonded to one or more of the adjacent metal surfaces. Steatitic ceramics or steatitic bodies are useful. Such coatings or insulating layers may be adhered or nonadhered to the adjacent metal surfaces. Particularly desirable insulating coatings or layers are those which adhere to at least one of the adjacent metal surfaces and beneficially expand and contract with a supporting metal body as temperatures are varied. Desirably such coating does not react or become unattached to the body during temperature cycle. Particularly desirable insulating layers or coating are applied by well-known techniques to metal surfaces by the so-called flame spraying technique. A suitable vitreous or ceramic powder is fed into a flame such as an oxyacetylene flame or a plasma flame and fused together and to the surface of the metal. One such technique is set forth in U.S. Pat. No. 3,607,343. A variety of useful and highly desirable coatings are obtained by such a technique. Such coatings advantageously may comprise a mixture of aluminum oxide for example 97.5 parts by weight aluminum oxide with 2.5 parts by weight titanium dioxide or coatings comprising principally titanium dioxide are 1:1 by weight mixtures of titanium oxide and the like compositions well-known to those skilled in the art of metal coating. Due to the relatively low voltages customarily employed in resistive heated laminated platens such as those of the present invention, the insulating coating is required primarily to act as a spacer between the adjacent metal surfaces.

Advantageously, such coatings have been applied to Type 316 stainless steel in an unmeasured thin coating which is relatively porous but coherent, and adequate electrical insulation is obtained, when employing as a power source a welding generator with an open circuit voltage of about 40 volts.

Advantageously either alternating current or direct current may be employed and the polarity of the current supplied to the heating platens is generally found to be immaterial. For most laminating applications, employing platens of the present invention as depicted in the figures, single phase power has been found adequate. However, where substantially larger quantities of power are to be dissipated in the heating platens, platens in accordance with the present invention utilizing 3 phase power can be readily designed by anyone of minimal skill in the art. Platens in accordance with the present invention are found to exhibit excellent resistance to mechanical abuse and provide high reliability in service.

Platens in accordance with the invention are readily fabricated using conventional metal fabricating techniques. A variety of materials may be utilized as electrical insulation layers between adjacent platen lamina; for example, mica, phenolic resin, fabric reinforced sheets, polyfluoroethylene sheet and the like; particularly and advantageously insulating material and so-called flame sprayed ceramics such as are set forth in U.S. Pat. Nos. 3,607,343 and 3,649,757; commercially desirable powders sold under the trade designation of Metco 101, which is primarily aluminum oxide containing a small amount of titanium dioxide.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An apparatus for the thermal bonding of synthetic resinous bodies wherein the apparatus provides a heated platen to be disposed between adjacent bodies to be joined, means for moving said platen relative to the bodies to be joined, means to heat the platen to a temperature sufficient to heat plastify adjacent surfaces of the bodies to be joined, and means to contact said heated surfaces which on cooling provide a bond between adjacent foam bodies, the improvement which comprises an improved heating platen, the heating platen being of laminar construction and generally planar configuration, the heating platen comprising a first electrically conductive lamina and a second electrically conductive lamina, the first and second lamina being affixed to each other in generally face to face relationship; the first and second lamina having a first electrical terminal and a second common electrical terminal, the first and second lamina each defining a plurality of slots wherein the first and second lamina are joined at a plurality of locations to provide mutual mechanical reinforcing to minimize bending of the platen under service conditions with the further limitation that the platen comprises two generally like heating elements joined together along a centrally located line and electrically insulated from each other except at the centrally located line and electrical feed terminals.

2. The apparatus of claim 1 including a rigid spacer element disposed between the electrically conductive lamina.

3. The apparatus of claim 1 wherein the platen has a leading edge, a trailing edge, a terminal edge and a remaining edge, the platen having electrical terminals on the terminal edge.

4. The apparatus of claim 1 wherein the platen has at least two generally serpentine heating elements disposed in generally face to face relationship.

5. The apparatus of claim 1 wherein the platen comprises stainless steel.

6. The apparatus of claim 1 wherein the heating elements are insulated from each other by means of a ceramic coating.

7. An improved heating platen, the heating platen being of laminar construction and generally planar configuration, the heating platen comprising a first electrically conductive lamina and a second electrically conductive lamina, the first and second lamina being affixed to each other in generally face-to-face relationship; the first and second lamina having a first electrical terminal and a second common electrical terminal; the first and second lamina each defining a plurality of slots wherein the first and second lamina are joined at a plurality of locations to provide mutual mechanical reinforcing to minimize bending of the platen under service conditions wherein the platen comprises two generally like heating elements joined together along a centrally located line and electrically insulated from each other except at the centrally located line and electrical feed terminals.

8. The platen of claim 7 including a rigid spacer element disposed between the electrically conductive lamina.

9. The platen of claim 7 wherein the platen has a leading edge, a trailing edge, a terminal edge and a remaining edge, the platen having electrical terminals on the terminal edge.

10. The platen of claim 7 wherein the platen has at least two generally serpentine heating elements disposed in generally face-to-face relationship.

11. The platen of claim 7 wherein the platen comprises stainless steel.

12. The platen of claim 7 wherein the heating elements are insulated from each other by means of a ceramic coating.

13. An apparatus for the thermal bonding of synthetic resinous bodies wherein the apparatus provides a heated platen to be disposed between adjacent bodies to be joined, means for moving said platen relative to the bodies to be joined, means to heat the platen to a temperature sufficient to heat plastify adjacent surfaces of the bodies to be joined, and means to contact said heated surfaces which on cooling provide a bond between adjacent foam bodies, the improvement which comprises an improved heating platen, the heating platen being of laminar construction and generally planar configuration, the heating platen comprising a first electrically conductive lamina and a second electrically conductive lamina, the first and second lamina being affixed to each other in generally face to face relationship; the first and second lamina having a first electrical terminal and a second common electrical terminal, the first and second lamina each defining a plurality of slots wherein the first and second lamina are joined to provide mutual mechanical reinforcing to minimize bending of the platen under service conditions, the platen comprises a first layer of generally parallel bar-like elements spaced from each other and a second layer of generally parallel bar-like elements in face-to-face relationship and in register with the first bar-like elements, a plurality of adjacent pairs of bar-like elements of the first and second layers being joined by a generally diagonally disposed bar-like element extending between remote ends of adjacent bar-like pairs and being electrically connected thereto only adjacent terminal ends of the bar-like pairs.

14. The apparatus of claim 13 including rigid electrical insulating means disposed between adjacent diagonal elements.

15. An improved heating platen, the heating platen being of laminar construction and generally planar configuration, the heating platen comprising a first electrically conductive lamina and a second electrically conductive lamina, the first and second lamina being affixed to each other in generally face-to-face relationship; the first and second lamina having a first electrical terminal and a second common electrical terminal; the first and second lamina each defining a plurality of slots wherein the first and second lamina are joined to provide mutual mechanical reinforcing to minimize bending of the platen under service conditions; wherein the platen comprises a first layer of generally parallel bar-like elements spaced from each other and a second layer of generally parallel bar-like elements in face-to-face relationship and in register with the first bar-like elements, a plurality of adjacent pairs of bar-like elements of the first and second layers being joined by a generally diagonally disposed bar-like element extending between remote ends of adjacent bar-like pairs and being electrically connected thereto only adjacent terminal ends of the bar-like pairs.

16. The platen of claim 15 including rigid electrical insulating means disposed between adjacent diagonal elements.

* * * * *